United States Patent
Mizuno et al.

(10) Patent No.: US 6,608,659 B1
(45) Date of Patent: Aug. 19, 2003

(54) REFLECTIVE LIQUID CRYSTAL DISPLAY APPARATUS

(75) Inventors: Hiroaki Mizuno, Kanazawa (JP);
Shingo Fujita, Ishikawa-gun (JP);
Tetsu Ogawa, Kanazawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/743,611

(22) PCT Filed: Sep. 8, 1999

(86) PCT No.: PCT/JP99/04856

§ 371 (c)(1),
(2), (4) Date: Feb. 7, 2001

(87) PCT Pub. No.: WO00/17699

PCT Pub. Date: Mar. 30, 2000

(30) Foreign Application Priority Data

Sep. 21, 1998 (JP) .......................................... 10-265609

(51) Int. Cl.⁷ ............................................. G02F 1/1343
(52) U.S. Cl. ....................................... 349/113; 349/122
(58) Field of Search ................................ 349/122, 138, 349/113

(56) References Cited

U.S. PATENT DOCUMENTS

| 4,494,824 A | * | 1/1985 | Nakamura et al. ........... 349/132 |
| 5,465,169 A | * | 11/1995 | Eguchi ........................ 349/124 |
| 5,523,871 A | * | 6/1996 | Shibata et al. .............. 349/123 |
| 5,578,103 A | * | 11/1996 | Araujo et al. ................ 65/60.5 |
| 2002/0036734 A1 | * | 3/2002 | Ichimura .................... 349/113 |

FOREIGN PATENT DOCUMENTS

| EP | 0 578 471 A1 | 1/1994 | |
| EP | 0 709 710 A1 | 5/1996 | |
| EP | 0 896 243 A2 | 2/1999 | |
| EP | 0 896 243 A3 | 2/1999 | |
| GB | 2078421 A | 1/1982 | |
| JP | 55-26625 | 2/1980 | |
| JP | 59-213644 | 12/1984 | |
| JP | 62-207355 | 9/1987 | |
| JP | 1-26820 | 1/1989 | |
| JP | 05019264 A | * 1/1993 | ......... G02F/1/1337 |
| JP | 6-258663 | 6/1994 | |
| JP | 06202092 | 7/1994 | |
| JP | 6-208111 | 7/1994 | |
| JP | 7-84252 | 3/1995 | |
| JP | 7-146469 | 6/1995 | |
| JP | 08076106 A | * 3/1996 | ......... G02F/1/1335 |
| JP | 8-179252 | 7/1996 | |
| JP | 09123337 A | * 5/1997 | ............. B32B/9/00 |
| JP | 10082995 | 3/1998 | |

* cited by examiner

*Primary Examiner*—Kenneth Parker
(74) *Attorney, Agent, or Firm*—Parkhurst & Wendel, L.L.P.

(57) ABSTRACT

A reflection liquid crystal display device comprises an upper substrate; a transparent electrode formed into an electrode pattern on one side of the upper substrate; an alignment film formed on the transparent electrode; a lower substrate opposed to the upper substrate; a reflective metal electrode including Al-alloy electrodes formed into an electrode pattern and opposed to the upper substrate; a protective insulation film formed on the reflective metal electrode; an alignment film formed on the protective film; and liquid crystal filled between the upper substrate and the lower substrate. The protective insulation film has a volume resistivity of small than $1 \times 10^9$ Ω-cm. The defects due to the charges stored in the protective insulation film are alleviated, and a uniform display is achieved.

6 Claims, 2 Drawing Sheets

REFLECTIVE LIQUID CRYSTAL DISPLAY APPARATUS

TECHNICAL FIELD OF THE INVENTION

The present invention relates to a reflective liquid crystal display apparatus with a reflection electrode.

BACKGROUND OF THE TECHNOLOGY

Previous reflective liquid crystal display apparatuses comprise a liquid crystal cell operating on TN or STN mode and sandwiched between a pair of substrates on which a transparent electrode has been formed, a pair of polarizers disposed in a manner such that they sandwich the liquid crystal cell, and a reflector disposed on the outer side of a polarizer on the lower substrate. However, in this configuration, as light passes the polarizers four times, the display is dark. Transmissivity of a polarizer is at most 45%. The transmissivity of polarized light parallel to the absorption axis of the polarizer is roughly 0%, while the transmissivity of polarized light perpendicular to the absorption axis is roughly 90%. Accordingly, the transmissivity of this configuration is calculated to be $(0.9)^4 \times 50\% = 32.8\%$ suggesting that reflectivity saturates at about 33% even for a black and while display panel. Especially, as a display of a color liquid crystal display panel in which color filter is formed on one of the substrates becomes darker than black and white display because of absorption by the color filter, it becomes difficult to secure brightness required of a reflective display. It also suffers inevitable parallax due to the thickness of substrates that exist between the reflector and the liquid crystal.

Accordingly, with a view to making the display brighter, some proposals have been made on configurations in which only one polarizer on the upper side of a liquid crystal cell is used and the liquid crystal cell is sandwiched between the polarizer and a reflector (for example, Japanese Laid-Open Patent Application No. Hei 7-146469 and Japanese Laid-Open Patent Application No. Hei. 7-84252). In these configurations, as light passes the polarizer only twice, the reflectivity of a black and white display panel becomes $(0.9)^2 \times 50\% = 40.5\%$ thus providing about 23.5% improvement in the reflectivity over configurations using two polarizers.

Also, with a view to making the display brighter, a reflective liquid crystal display panel of PCGH mode (phase-change type guest-host mode) has been proposed (ref. H. Seki: 1996 SID, p. 614, SID 96 Digest) as a configuration which does not use any polarizer at all. The reflectivity of this black and white display panel configuration is about 66% suggesting a bright display.

In the above described configurations either using a single polarizer or not using any polarizer at all, as a reflector can be disposed inside the liquid crystal cell by forming on the lower substrate a metal reflection electrode which works both as a reflector and an electrode, the issue of parallax can also be solved. It is practical that the-metal reflection electrode contains a film having Al that has a high reflectivity as the main ingredient (as in Japanese Patent Application No. Hei 9-208902, for example).

Also, in previous liquid crystal display apparatuses, an insulating film for electrode protection with a high-hardness value is formed between at least one of the electrodes and an alignment film. This insulating film for electrode protection prevents short-circuit between the upper and the lower electrodes caused by breakage of the alignment film due to foreign objects mixed in the liquid crystal cell or due to spacers. For advantages in productivity and cost, formation of the insulating film for electrode protection is performed by printing method in which a printed coat is heat treated by heating at 350° C. or lower. Heat treatment at above 350° C. will result in a higher resistance of ITO (indium tin oxide) that forms a transparent electrode. As the material for the insulating film for electrode protection, a composition containing silica oligomer, zirconia oligomer, or titania oligomer, for example, as the main ingredients is used. The composition is copolymerized by combined UV irradiation and heat treatment at about 300° C. to obtain an inorganic insulating film with a high value of hardness. Also, in the formation of an insulating film for electrode protection onto a metal reflection electrode containing at least Al as the main ingredient, internal stress is produced in the metal reflection electrode due to heat-treatment, thus suffering a decrease in the bonding stress between the substrate and the metal reflection electrode. Accordingly, a proposal has been made to control the heat treatment temperature (for example, Japanese Laid-Open Patent Application No. Hei 10-216265).

A previous liquid crystal cell in which an insulating film for electrode protection is formed like this suffers defects in display caused by a slight change in the tilt angle due to scratches on the insulating film for electrode protection resulting from rubbing of the alignment film. This is because hysteresis in the electrical characteristic of the liquid crystal cell is produced as the voltage applied to the liquid crystal changes as charges are stored in the insulating film for electrode protection thus causing enlargement of a slight change in tilt of the alignment film into the form of electrical characteristic of the liquid crystal cell. Especially in a reflective liquid crystal display apparatus comprising an upper substrate on which a transparent electrode has been formed and a lower substrate on which an Al-containing metal reflection electrode has been formed, the standard electrode potential produced on the transparent electrode and the standard electrode potential produced on the metal reflection electrode are greatly different. As a result, charges stored in the insulating film for electrode protection increase thereby causing conspicuous defects in display.

The present invention addresses the above described problems of previous reflective liquid crystal display apparatuses and aims at providing a reflective liquid crystal display apparatus with a uniform display by controlling the defects in display due to storage of charges in the insulating film for electrode protection.

DISCLOSURE OF THE INVENTION

With a view to solving the above-described problems, the reflective liquid crystal display apparatus in accordance with the present invention comprises an upper substrate, a transparent electrode formed into an electrode pattern on one side of the upper substrate, an alignment film on the side of the upper substrate formed on the surface of the transparent electrode, a lower substrate disposed opposite to the upper substrate, a metal reflection electrode formed into an electrode pattern on the lower substrate and containing a film with at least Al as the main ingredient, an insulating film for electrode protection formed on the surface of the metal reflection electrode, an alignment film on the side of the lower substrate formed on the surface of the insulating film for electrode protection, and liquid crystals filled in the space between the upper and the lower substrates, and the volume resistivity of the insulating film for electrode protection is adjusted to $1 \times 10^9$ Ω·cm or smaller. With this configuration, the charges stored in the insulating film for electrode protection can be reduced and the defects in display due to the insulating film for electrode protection can be controlled.

Also, in another embodiment of the present invention, the volume resistivity of the insulating film for electrode protection is adjusted to $1\times10^5$ Ω·cm or greater. With this, a risk of short-circuit between the upper and the lower electrodes under a compressive load can be controlled thereby providing a reflective liquid crystal display apparatus which can realize a uniform display.

Also, in still another embodiment of the present invention, the metal reflection electrode is a dual-layer formed by laminating a Ti layer and an Al-alloy layer. By employing this configuration, a reflective liquid crystal display apparatus with improved electromigration resistance and corrosion resistance can be provided.

Also, in still another embodiment of the present invention, the upper and the lower substrates are made of soda lime glass, and an $SiO_2$ film is formed between the electrode pattern and the substrates. Employment of this configuration allows a use of inexpensive glass substrates.

Also, in still another embodiment of the present invention, an inorganic insulating film is used as the insulating film for electrode protection. By employing this configuration, the risk of short-circuit between the upper and the lower electrodes can be controlled thereby providing a reflective liquid crystal display apparatus which can realize a uniform display.

DESCRIPTION OF THE PREFERRED EMBODIMENTS

Referring to drawings, a description will be given below on exemplary embodiments of the present invention.

Figure 1:
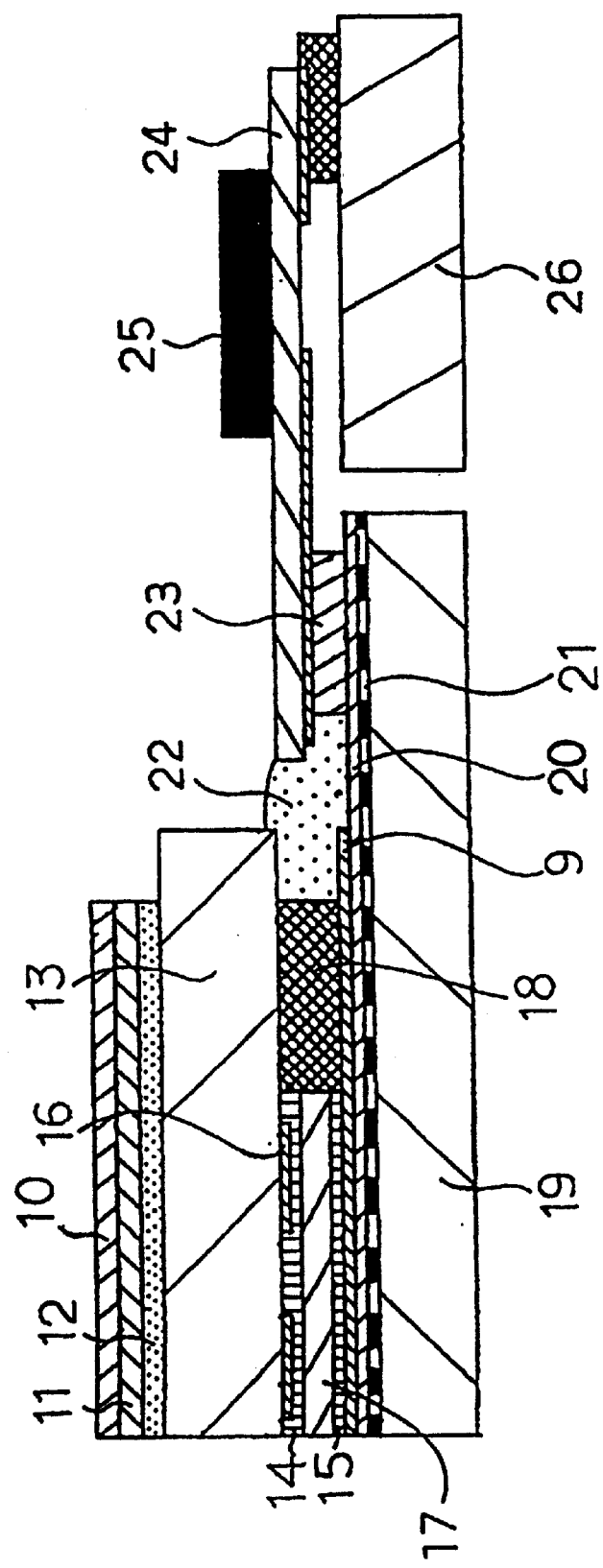
FIG. 1 is a cross-sectional view of a reflective liquid crystal display apparatus in an exemplary embodiment of the present invention.

FIG. 1 is a cross-sectional view of a reflective liquid crystal display apparatus in an exemplary embodiment of the present invention. As illustrated in FIG. 1, a striped transparent electrode 16 and an alignment film 14 are formed on the bottom surface of an upper substrate 13. Also, a reflection electrode is formed on the top surface of a lower substrate 19 by laminating a Ti electrode 21 and an Al-alloy electrode 20. Though this reflection electrode is also striped, as it is intersecting the stripes of the upper transparent electrode 16 at right angles, it is drawn on a plane in FIG. 1. The reflection electrode is covered with an insulating film for electrode protection 9, and an alignment film 15 is formed on its surface. Sandwiching liquid crystal 17, the substrates 13 and 19 form a liquid crystal cell after being sealed with a sealing resin 18. A scattering film 12, a polymer film 11, and a polarizer 10 are disposed on the top surface of the upper substrate 13. Here, it is important that the volume resistivity of the insulating film for electrode protection 9 be adjusted to the range $1\times10^5$ to $1\times10^9$ Ω·cm.

Figure 2:
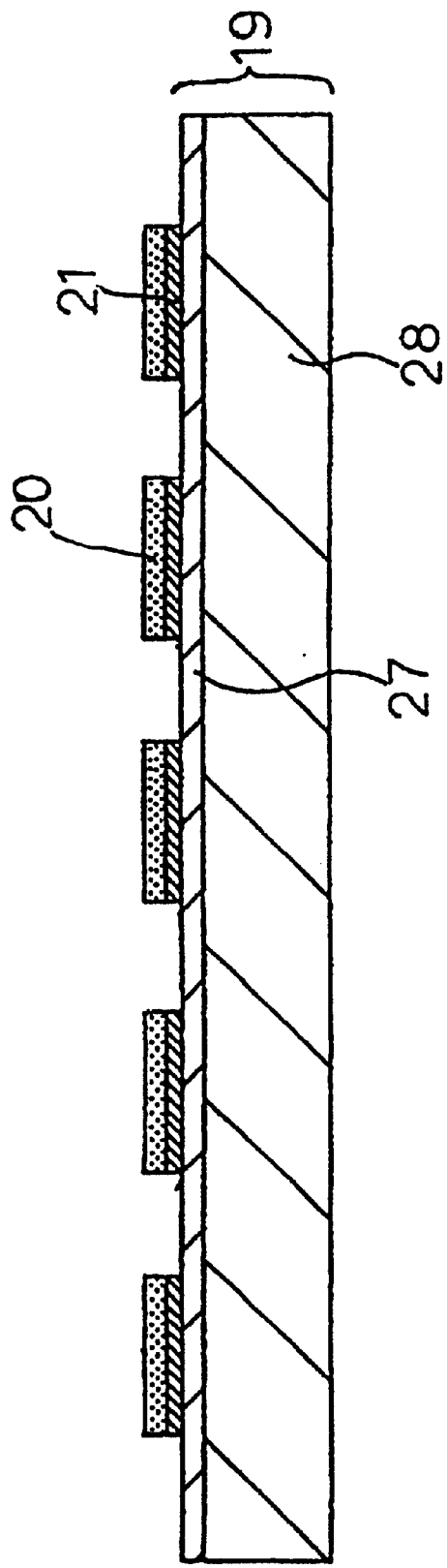
FIG. 2 is a partial cross-sectional view to illustrate details of the reflective liquid crystal display apparatus in the exemplary embodiment of the present invention.

FIG. 2 is a partial cross-sectional view illustrating details of the lower substrate 19, the Al-alloy electrode 20 and the Ti electrode 21 in FIG. 1. As illustrated in FIG. 2, the lower substrate 19 is formed by forming an $SiO_2$ film 27 on a soda lime glass substrate 28. A dual-layer-film (Ti film 21 and Al-alloy film 20) specular reflection type metal reflection electrode is formed on top of the $SiO_2$ film 27. The reason of forming the $SiO_2$ film 27 on the soda lime glass substrate 28 is to prevent dissolution of alkali into the liquid crystal. The dual-layer metal reflection electrode is made by laminating an Al-alloy film 20 on a Ti film 21, and the same electrode patterns are formed using this dual-layer film.

Also, as is the case with the lower substrate 19, a substrate formed by forming an $SiO_2$ film on a soda lime glass substrate is used as the upper substrate 13, and the transparent electrode 16 made of ITO (indium tin oxide) is formed on it. It is to be noted that, in FIG. 1, an integral upper substrate 13 is illustrated for convenience rather than separately showing the soda lime glass substrate and the $SiO_2$ film.

Now, a description will be given below on an example of the method for fabricating the reflective liquid crystal display apparatus of this exemplary embodiment.

First, an electrode pattern as illustrated in FIG. 2 is formed by successively laminating a 500 Å-thick Ti film 21 and a 2000 Å-thick Al-alloy film 20 and patterning on a soda lime glass substrate 28 (lower substrate 19) on which an $SiO_2$ film 27 has been formed.

On top of the above, a solution having silica oligomer, zirconia oligomer, and titania oligomer as the main ingredients with an oxide of phosphor mixed as a dopant is printed, temporarily cured at 80° C., UV-irradiated at 6000 mJ/cm$^2$, and then heat-treated at 250° C. to obtain an insulating film for electrode protection 9, being an inorganic insulating film consisting of $SiO_2$, $TiO_2$, and $ZrO_2$. During the process of forming the insulating film for electrode protection 9, the volume resistivity is adjusted to a range from $1\times10^5$ to $1\times10^9$ Ω·cm by changing the added quantity of the oxide of phosphor as the dopant.

On the other hand, a transparent electrode 16 is formed with ITO on a separate soda lime glass substrate on which an $SiO_2$ film has been formed. Alignment films 14 and 15 are formed by printing a 5% by weight solution of polyimide in N-methyl-2-pyrrolidinone on each of the upper substrate 13 on which the transparent electrode 16 has been formed and the lower substrate 19 on which the Ti film 21 and the Al-alloy film 20 have been formed, curing at 200° C., followed by alignment processing by rotary rubbing method using rayon cloth thereby to realize STN mode liquid crystal with a 250° twist.

After forming the alignment films 14 and 15, a thermosetting sealing resin 18 mixed with 1% by weight of glass fibers with a diameter of 5.5 μm is printed on the periphery of the upper substrate 13. Next, resin beads with a diameter of 5.0 μm are sprinkled at a density of 200/mm$^2$ on the display region of the lower substrate 19. Subsequently, the upper substrate 13 and the lower substrate 19 are put together, the sealing resin 18 is cured at 150° C., liquid crystal 17 prepared by mixing a predetermined quantity of chiral liquid crystal into ester group nematic liquid crystal with refractive index anisotropy $\Delta n_{LC}$ of 0.16 is vacuum injected, sealed with UV-cured resin (not shown), and cured with UV light.

On the upper substrate 13 of the liquid crystal cell thus formed, a forward-scattering film (trade name "Lumisty") made by Sumitomo Chemical Co., Ltd. and having a scattering direction in the range 0° to 50° from the normal to the film is pasted as a scattering film 12. Polycarbonate is pasted on top of it as a polymer film 11, which is used as a phase retardation film. The polymer film 11 comprises two sheets of polymer films with different slow axes wherein the polymer film on the side of the liquid crystal cell is adjusted in a manner such that it has a retardation of 0.3 μm and a slow axis of 90° relative to the alignment direction of the upper substrate 13, and the upper polymer film has a retardation of 0.5 μm and a slow axis of 45° relative to the alignment direction of the upper substrate 13. Furthermore, as a polarizer 10, a neutral gray polarizer (SQ-1852AP manufactured by Sumitomo Chemical Co., Ltd.) processed with anti-glare treatment is pasted in a manner such that its absorption axis coincides with the slow axis of the lower part of the polymer film 11.

Additionally, as electronic components for driving the liquid crystal cell, a printed circuit board 26 mounted with electronic components and a TAB tape carrier 24 on which an LSI chip 25 is mounted are used, the printed circuit board 26 and the TAB tape carrier 24 are interconnected, and the electrodes 20 and 21 of the liquid crystal cell are connected to the TAB carrier 24 via an anisotropic conductive adhesive 23.

Furthermore, the exposed portion of the electrode between the electrode (right portion of FIG. 1 including the liquid crystal cell) to which electronic components for driving the liquid crystal cell are connected via the anisotropic adhesive 23 and the display portion (left portion of FIG. 1) is covered with an acrylic resin 22, Tuffy (TF1141), manufactured by Hitachi Chemical Co., Ltd.

By the above configuration, a normally-black reflective liquid crystal display apparatus is obtained which is of simple matrix drive with a duty ratio of 1/240 and which is capable of displaying low-reflectivity achromatic black, high-reflectivity achromatic white, and achromatically changing display from black to white.

In the above configuration, by using an inorganic insulating film as the insulating film for electrode protection 9 and adjusting its volume resistivity to a range from $1 \times 10^5$ to $1 \times 10^9$ Ω·cm, it is possible to control the risk of short-circuit between the upper and the lower electrodes, and to reduce charges stored in the insulating film for electrode protection and control defects in display due to the insulating film for electrode protection. This effect has been experimentally verified, examples of which being described in the following exemplary embodiments.

The following examples correspond to the reflective liquid crystal display apparatus in the above described exemplary embodiment of the present invention. They represent results of verification of the above described effect on examples and comparative examples fabricated by changing the volume resistivity of the insulating film for electrode protection in accordance with the method of fabrication of the above described exemplary embodiment of the present invention.

When forming an insulating film for electrode protection 9 in accordance with the method of fabrication in the above described exemplary embodiment of the present invention, by changing the quantity of the oxide of phosphor to be added as a dopant to a solution having silica oligomer, zirconia oligomer, and titania oligomer as the main ingredients, examples 1 to 5 and comparative examples 1 to 3 provided with an insulating film for electrode protection 9 with different volume resistivities within the range $1 \times 10^4$ to $1 \times 10^{11}$ Ω·cm were fabricated as shown in Table 1. In this case, the film thickness of each of the insulating films for electrode protection 9 was chosen to be 1000 Å. By the way, comparative example 3 was fabricated by using a solution which had not been added with any dopant at all.

TABLE 1

| | Volume resistivity (Ω · cm) | Defects in display due to hysteresis | Occurrence of short-circuit Under compressive stress |
|---|---|---|---|
| Comp. example 1 | $1 \times 10^4$ | Almost nothing | Yes |
| Example 1 | $1 \times 10^5$ | Almost nothing | No |
| Example 2 | $1 \times 10^6$ | Almost nothing | No |
| Example 3 | $1 \times 10^7$ | Almost nothing | No |
| Example 4 | $1 \times 10^8$ | Almost nothing | No |
| Example 5 | $1 \times 10^9$ | Almost nothing | No |
| Comp. example 2 | $1 \times 10^{10}$ | Conspicuous | No |
| Comp. example 3 | $1 \times 10^{11}$ | Conspicuous | No |

In the event the material configuration of the electrodes on the upper and lower substrates were asymmetrical, depending on the configuration of the insulating film for electrode protection, hysteresis was caused in the electrical characteristic of the liquid crystal cell especially at low frequencies, thus causing conspicuous defects in display. For verification of this, electrical characteristic and defects in display were evaluated by applying a voltage at a frequency of 10 Hz to each of the examples and comparative examples. As shown in Table 1, in comparative examples 2 and 3 in which the volume resistivity of the insulating film for electrode protection was greater than $1 \times 10^9$ Ω·cm, hysteresis of electrical characteristic was large and conspicuous scratch type defects in display due to rubbing of the alignment film were observed. On the other hand, in the comparative example 1 and examples 1 to 5 in which the volume resistivity of the insulating film for electrode protection was $1 \times 10^9$ Ω·cm or smaller, hysteresis of electrical characteristic was small and scarcely no scratch type defect in display due to rubbing of the alignment film was observed.

Also, when a compressive stress is applied to the liquid crystal display apparatus, short-circuit between the upper and the lower electrodes may occur causing defects in display. For verification of this, occurrence of short-circuit between the upper and the lower electrodes was evaluated when a vertical compressive stress of 10 kg/mm² was applied in the vertical direction to each of the examples and the comparative examples. As shown in Table 1, short-circuit took place in the comparative example 1 in which the volume resistivity of the insulating film for electrode protection was smaller than $1 \times 10^5$ Ω·cm, whereas short-circuit did not take place in the examples 1 to 5 and comparative examples 2 and 3 in which the volume resistivity of the insulating film for electrode protection was $1 \times 10^5$ Ω·cm or greater. In this way, when the volume resistivity of the insulating film for electrode protection is too small, short-circuit tends to take place and the critical limit was found to be $1 \times 10^5$ Ω·cm. In addition, in order to prevent short-circuit in the event a compressive stress is applied, it is necessary that the mechanical hardness of the insulating film for electrode protection be large. Incidentally, with the examples 1 to 5 and comparative examples 2 and 3 in which the volume resistivity of the insulating film for electrode protection was $1 \times 10^5$ Ω·cm or greater, the pencil hardness was in the range 4H to 9H, which was preferable in preventing short-circuit between the upper and the lower electrodes.

Verification similar to the one described in these examples was performed on samples of which the insulating film for electrode protection was other inorganic insulating film and it was confirmed that similar result could be obtained.

From the above results, it was verified that, in the exemplary embodiment of the present invention, it is possible to control defects in display due to an insulating film for electrode protection by using an inorganic insulating film as the insulating film for electrode protection 9 and adjusting the volume resistivity to within the range from $1\times10^5$ to $1\times10^9$ Ω·cm thereby preventing short-circuit between the upper and the lower electrodes and reducing charges stored in the insulating film for electrode protection.

In this exemplary embodiment, although a description has been made on using an oxide of phosphor as a dopant for reducing volume resistivity of the insulating film for electrode protection, the dopant is not limited to it. Even by using an oxide of As or Sb as a dopant, for example, or even when no dopant is used, if the insulating film for electrode protection is an inorganic insulating film and the volume resistivity is $1\times10^9$ Ω·cm, an effect similar to the effect of this exemplary embodiment can be obtained.

Also, although a description has been made on the use of a dual-layer film prepared by successively forming Ti and Al-alloy films as the metal reflection electrode, insofar as it is a metal reflection electrode containing at least a film having Al as the main ingredient, an effect similar to the effect of the present exemplary embodiment can be obtained by using an inorganic insulating film as the insulating film for electrode protection and adjusting its volume resistivity to within the range $1\times10^5$ Ω·cm to $1\times10^3$ Ω·cm. However, in order to obtain high reliability in terms of electromigration resistance and corrosion resistance, it is preferable to employ a metal reflection electrode with a dual-layer film formed by successively forming Ti and an Al-alloy films.

Also, in this exemplary embodiment, although a description has been made on the use of an inorganic insulating film as the insulating film for electrode protection, it has been confirmed that, even when using an organic insulating film, insofar as one with a volume resistivity of $1\times10^9$ Ω·cm or smaller is used, the effect of reducing charges stored in the insulating film for electrode protection could be obtained. However, when the volume resistivity of the insulating film for electrode protection is too small such as smaller than $1\times10^5$ Ω·cm, the film does not perform the function required of an insulating film for electrode protection suggesting that a volume resistivity high enough to perform minimum function as an insulating film for electrode protection is required. However, a high-hardness inorganic insulating film is more preferable as the insulating film for electrode protection from the standpoint of preventing short-circuit between the upper and the lower electrodes.

Also, in this exemplary embodiment, although a description has been made that the upper and the lower substrates of the present invention were simple matrix substrates on which no thin-film device such as thin-film transistors had been formed, the substrates are not limited to such and substrates on which thin-film active devices such as amorphous silicon or polysilicon TFT have been formed may also be used.

Also, in this exemplary embodiment, although a description has been made that the upper and the lower substrates of the present invention were soda lime glass substrates on which an $SiO_2$ film had been formed, they are not limited to such and they may be non-alkaline glass substrates, for example.

Also, in this exemplary embodiment, although a description has been made that a specular type metal reflection electrode was used and that a scattering film was disposed on the upper substrate, the configuration is not limited to such, and a scattering type metal reflection electrode may be used. In this case, the scattering film 12 becomes unnecessary.

Also, in this exemplary embodiment, although a description has been made on a reflective liquid crystal display apparatus for black and white display, it is not limited to such, and the display apparatus may be a color reflective liquid crystal display apparatus incorporating a color filter, for example.

Also, in this exemplary embodiment, although a description has been made on the use of STN mode liquid crystal, the liquid crystal is not limited to it, and the reflective liquid crystal display apparatus may be one that uses other liquid crystal modes such as TN mode or PCGH mode with polarizers and polymer films adapted to the liquid crystal mode.

INDUSTRIAL APPLICATION

According to the present invention, charges stored in the insulating film for electrode protection can be reduced by adjusting volume resistivity of the insulating film for electrode protection to $1\times10^9$ Ω·cm or smaller, thereby allowing control of defects in display due to the insulating film for electrode protection and providing a reflective liquid crystal display apparatus that realizes uniform display.

In addition, by adjusting volume resistivity of the insulating film for electrode protection to $1\times10^5$ Ω·cm or greater or by using a high-hardness inorganic insulating film, short-circuit between the upper and the lower electrodes can be prevented.

What is claimed is:

1. A reflective liquid crystal display apparatus, comprising:
an upper substrate, a transparent electrode formed into an electrode pattern on one side of said upper substrate, an alignment film on the side of the upper substrate formed on the surface of said transparent electrode, a lower substrate disposed opposite to said upper substrate, a metal reflection electrode containing a film having at least Al as the main ingredient formed into an electrode pattern on the surface of said lower substrate opposite to said upper substrate, an insulating film for electrode protection formed on the surface of said metal reflection electrode, an alignment film on the side of the lower substrate formed on the surface of said insulating film for electrode protection, and liquid crystal filled in the space formed between said upper substrate and said lower substrate, wherein:
the volume resistivity of said insulating film for electrode protection is adjusted to $1\times10^9$ Ωcm or smaller as means for preventing charge storage in said insulating film for electrode protection, and
adjusting means of said volume resistivity is based on the quantity of additional oxide of phosphor.

2. The reflective liquid crystal display apparatus of claim 1, wherein said metal reflection electrode is a dual-layer film laminate of Ti and an Al alloy.

3. The reflective liquid crystal display apparatus of claim 1, further comprising an $SiO_2$ film, wherein said upper substrate and said lower substrate comprise soda lime glass and the $SiO_2$ film is located between said substrates and said electrode pattern.

4. The reflective liquid crystal display apparatus of claim 1, wherein said insulating film for electrode protection is an inorganic insulating film.

5. A reflective liquid crystal display apparatus comprising:
an upper substrate, a transparent electrode formed into an electrode pattern on one side of said upper substrate, an alignment film on the side of the upper substrate formed on the surface of said transparent electrode, a lower substrate disposed opposite to said upper substrate, a metal reflection electrode containing a film having at least Al as the main ingredient formed into an electrode pattern on the surface of said lower substrate opposite to said upper substrate, an insulating film for electrode protection formed on the surface of said metal reflection electrode, an alignment film on the side of the lower substrate formed on the surface of said insulating film for electrode protection, and liquid crystal filled in the space formed between said upper substrate and said lower substrate, wherein:

the volume resistivity of said insulating film for electrode protection is adjusted to $1\times10^9$ $\Omega$cm or smaller as means for preventing charge storage in said insulating film for electrode protection, said metal reflection electrode is a dual-layer film laminate of Ti and an Al alloy, and said insulating film for electrode protection is an inorganic insulating film.

6. A reflective liquid crystal display apparatus comprising:

an upper substrate, a transparent electrode formed into an electrode pattern on one side of said upper substrate, an alignment film on the side of the upper substrate formed on the surface of said transparent electrode, a lower substrate disposed opposite to said upper substrate, a metal reflection electrode containing a film having at least Al as the main ingredient formed into an electrode pattern on the surface of said lower substrate opposite to said upper substrate, an insulating film for electrode protection formed on the surface of said metal reflection electrode, an alignment film on the side of the lower substrate formed on the surface of said insulating film for electrode protection, and liquid crystal filled in the space formed between said upper substrate and said lower substrate, wherein:

the volume resistivity of said insulating film for electrode protection is adjusted to $1\times10^9$ $\Omega$cm or smaller as means for preventing charge storage in said insulating film for electrode protection, said upper substrate and said lower substrate comprise soda lime glass and an $SiO_2$ film is located between said substrates and said electrode pattern, and said insulating film for electrode protection is an inorganic insulating film.

* * * * *